UNITED STATES PATENT OFFICE.

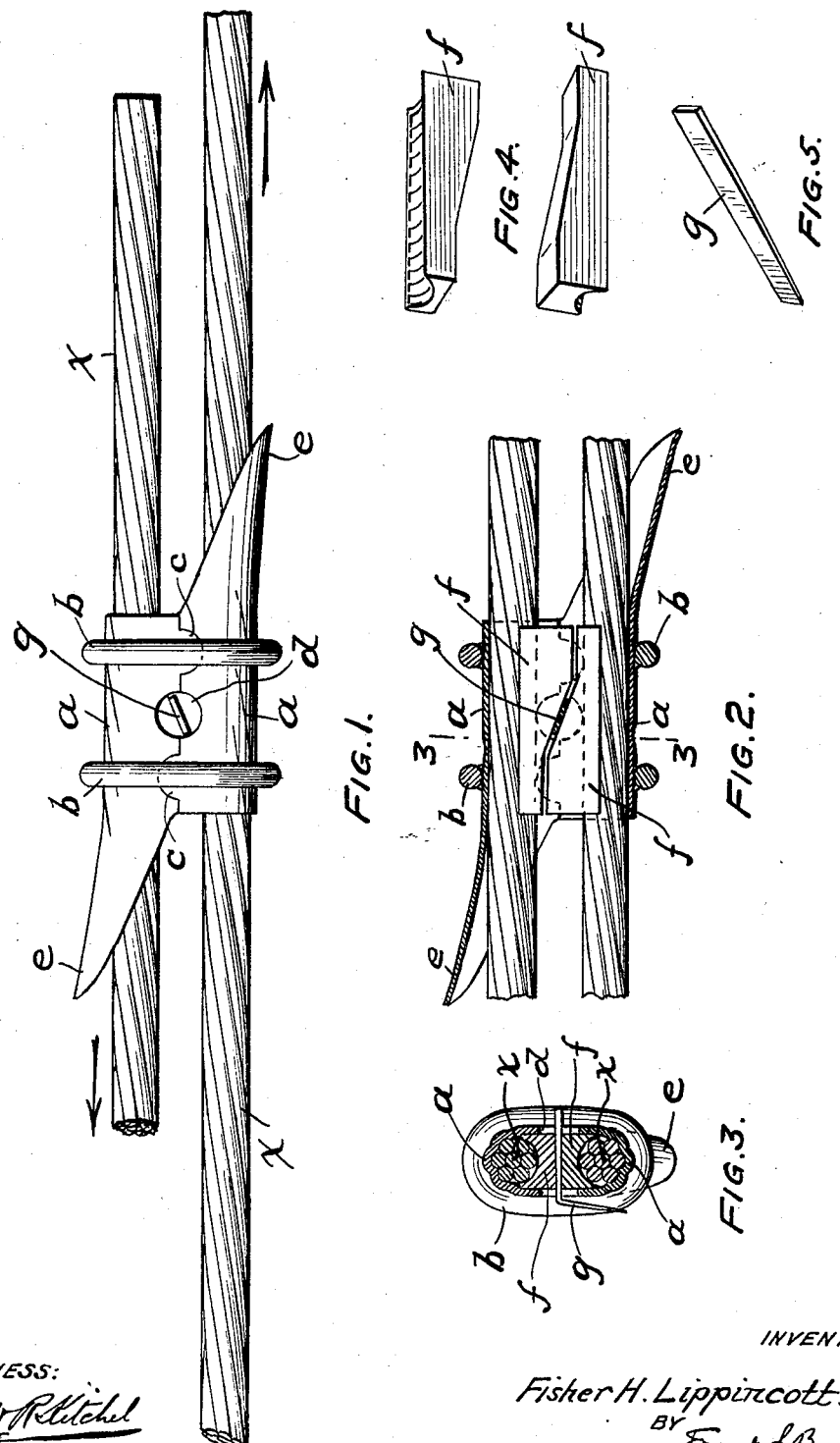

FISHER H. LIPPINCOTT, OF PHILADELPHIA, PENNSYLVANIA, ASSIGNOR TO A. H. AND F. H. LIPPINCOTT, OF PHILADELPHIA, PENNSYLVANIA, A FIRM COMPOSED OF A. H. LIPPINCOTT AND SAID FISHER H. LIPPINCOTT.

CABLE-CLAMP.

1,318,501.  Specification of Letters Patent.  Patented Oct. 14, 1919.

Application filed December 13, 1918. Serial No. 266,521.

*To all whom it may concern:*

Be it known that I, FISHER H. LIPPINCOTT, a citizen of the United States, residing at Philadelphia, county of Philadelphia, and State of Pennsylvania, have invented a new and useful Improvement in Cable-Clamps, of which the following is a full, clear, and exact description, reference being had to the accompanying drawings, which form a part of this specification.

The object of my invention is to provide a clamp for securing together sections of cable, wire, or other analogous devices upon which, in use, tension is imposed. Specifically, the object is to provide a device which may be manufactured economically and without the necessity of employing expensive special tools or dies or of exercising overcare in the process of manufacture, which may be readily assembled, which will resist maximum pulling strains to which the cables would be subjected in practical use, and whose clamping function will not be impaired by contraction and expansion due to atmospheric temperature variations.

A preferred embodiment of the invention is shown in the drawings, in which—

Figure 1 is a side elevation of the clamp in clamping relation with the two sections of cable.

Fig. 2 is a similar view with the clamp in section.

Fig. 3 is a cross-section through the clamp on line 3—3 of Fig. 2.

Fig. 4 is a detail perspective view of the two retaining wedges.

Fig. 5 is a detail perspective view of the locking key.

The clamp comprises a reinforced shell adapted to receive the cable sections to be clamped, longitudinally relatively slidable wedge members adapted to be interposed between the cable sections within the shell, and a key adapted to lock the wedge members in their fastening relation.

The shell, in its completed condition, is a unitary member of flattened tubular form in cross-section, reinforced by a pair of rings. The shell may be made of tubular stock, but it is preferred to form the two halves $a$, $a$, separately by stamping and then unite them by means of soldering thereto the encircling rings $b$, $b$. Each shell section is provided with a semi-circular projection $c$ projecting from each edge and fitting a complementary recess in the abutting edge of the other shell section. This avoids the danger of separation of the shell sections under longitudinal strain. Abutting edges of the two shell sections are also provided with registering recesses, forming a circular orifice $d$ for the reception of the locking key, as will be hereinafter explained. Each shell section is provided with a longitudinally extending tapered extension $e$ which flares outwardly from the axis of the shell. The extensions $e$ of the two sections extend in respectively opposite directions.

For certain uses, as, for instance, where the clamp is employed to fasten a free end of a cable to a section of cable between its ends, only one shell section need be provided with an extension. These outwardly flared wings or extensions are of importance in that the strong pulling action upon the cable sections tends to tilt the clamp at an angle to the longitudinal direction of extension of said cable sections and without such extensions the cable would shear off at a point close to the end of the clamp.

On opposite sides of its longitudinal center, each shell section is shaped to form a seat for an adjacent cable section, and is preferably spirally grooved to correspond with the spirally ridged cable section to be seated therein.

The two cable sections $x$, $x$, to be clamped together are inserted into opposite sides of the shell and are positioned together by means of two wedge-shaped retainers $f$, $f$, which are introduced into the shell from opposite ends thereof and interposed between the two cable sections. By pushing or tapping the two retainers in opposite directions, they will, by reason of their wedge contour, be forced laterally against the cable sections and confine them in their seats within the shell. The wall of each retainer which engages the cable section is of concave form and corrugated or otherwise roughened to enable it to secure an adequate grip upon the cable section.

After the cable sections are thus fastened together, a wedge-shaped key $g$ is inserted, through the orifices $d$, in one side of the shell, between the retaining wedges $f$, $f$, and driven laterally between the wedges and through the orifice on the other side of the shell, the projecting end being then bent down against the outer wall of the shell. By this means, the retaining wedges are forced laterally with considerable force, so as to confine the cable sections very tightly against their seats within the shell.

Comparative tests demonstrate that a clamp constructed in accordance with my invention has a pronouncedly superior clamping force. Although it is known to make cable clamps of fewer parts, the elements of my improved clamp can be made very cheaply, and no nice accuracy of manufacture is required. The preliminary application of the retaining wedges does not require a powerful, or any, driving action; and the final tightening or locking action is effected by driving the key into place, during which operation there is no substantial relative longitudinal movement of the associated parts. If expansion and contraction, due to changes of temperature, affects the grip of the clamp, the power of the cable will tighten the grip and prevent the cable from slipping.

With my clamp, if the pulling strain becomes sufficient to start slipping of the wedges, the slipping is immediately checked by their automatic adjustment.

Having now fully described my invention, what I claim and desire to protect by Letters Patent is:

1. A clamp for locking together cable sections or the like, comprising an exterior shell, interior retainers adapted to position the cables within the shell, and a key adapted to engage the retainers and securely lock the cables in the shell.

2. A clamp for locking together cable sections or the like, comprising an exterior shell providing oppositely located seats for the respective cables, a pair of wedge-shaped retainers adapted to be positioned between the cables to force them laterally against their respective seats, and a key adapted to be driven between the retainers.

3. A clamp for locking together cable sections or the like, comprising a shell providing seats for the respective cables, maintained in fixed relation with each other, a pair of wedge-shaped retainers adapted to be positioned between the cables and, by longitudinal movement in opposite directions relatively to each other and to the shell, be displaced laterally to confine the cables within their respective seats, and a key adapted to be driven laterally between the retainers to securely force the cables which they respectively engage against the respective shell seats.

4. A clamp for locking together cable sections or the like comprising a shell, means to secure the cable sections within the shell, and beyond the end of the shell a longitudinally-extending, tapered extension flared outward toward its extremity and so positioned as to extend along the corresponding cable section.

5. A clamp for locking together cable sections or the like comprising a shell provided, at opposite sides and beyond opposite ends of the shell with longitudinally-extending tapered extensions flared outward toward their extremities, and means to secure two cable sections within the shell respectively along said opposite sides thereof.

6. A clamp for locking together cable sections or the like, comprising a shell made of two sections, a projection along one of the abutting edges of one shell section engaging a recess in the adjacent abutting edge of the other shell section, and a pair of reinforcing rings each surrounding both shell sections, whereby the shell sections are held from relative longitudinal displacement and lateral distortion, each shell section being provided along its longitudinal central zone with a seat for a cable, one or both of the two shell sections provided with a longitudinally-extending tapered outwardly flared extension, a pair of wedges adapted to be inserted within the shell between the cables and to slide longitudinally one upon the other and thereby displace the cable sections laterally against their seats, and a key adapted to be driven laterally between the wedges and through orifices in opposite walls of the shell.

In testimony of which invention, I have hereunto set my hand, at Philadelphia, Pa., on this 9th day of December, 1918.

FISHER H. LIPPINCOTT.

Copies of this patent may be obtained for five cents each, by addressing the "Commissioner of Patents, Washington, D. C."